May 20, 1969        H. BOIVIN        3,445,320

FLOOR COVERING

Filed May 5, 1965

INVENTOR
Horace BOIVIN
BY
ATTORNEYS

United States Patent Office 3,445,320
Patented May 20, 1969

3,445,320
FLOOR COVERING
Horace Boivin, P.O. Box 399, 100 Dennison W., Granby, Quebec, Canada
Filed May 5, 1965, Ser. No. 453,298
Int. Cl. B32b 27/30, 17/10, 15/20
U.S. Cl. 161—83                         6 Claims

ABSTRACT OF THE DISCLOSURE

A floor covering formed of a backing layer of foam material covered on one face thereof with a fabric of tightly woven glass fibre followed by a first layer of polyvinyl chloride over the free surface of which a heat-absorbing layer constituted of a plurality of aluminum chips is bonded, and a final facing layer of polyvinyl chloride bonded over said heat-absorbing layer.

---

The instant invention generally relates to floor covering, more specifically cushioned floor covering, and is an improvement of the floor covering disclosed and claimed in my prior U.S. Patent No. 3,002,868 of Oct. 3, 1961.

In attempting to improve the wearing qualities of the floor covering of this patent, one of the desired features was to make the wear-resistant resin layer, usually polyvinyl chloride, more resistant to heat, particularly that produced by cigarette butts being put out and crushed, particularly in public buildings. There readily came to mind the use of a thin sheet of a heat-absorbing metal that would be inserted between the layer of tightly woven glass fabric and the polyvinyl chloride wear covering. A sheet of aluminum did indeed operate as desired in that it adequately absorbed the heat generated by a cigarette butt, but it had serious disadvantages and drawbacks. When provided with such a metal layer, the floor covering was stiffened and the wear resistant layer tended to be brittle and show cracks thereon when folded or bent even slightly and in some cases caused defacing of the decorative design.

By decreasing the thickness of the metal sheet, it was possible to avoid cracking of the top wear-resistant layer but the heat absorption was also reduced while wrinkles still were formed thereon giving the decorative design an unsightly appearance.

I have found that the above-mentioned disadvantages can be overcome with the improvement of my invention which consists in providing two layers of the wear-resistant resin, preferably polyvinvyl chloride, and inserting therebetween a layer formed of a plurality of minute pieces of heat-absorbing metal bonded to both the wear-resistant resin layers.

It is believed that a better understanding of the invention will be afforded by the description that follows having reference to the appended drawing wherein.

Figure 1:
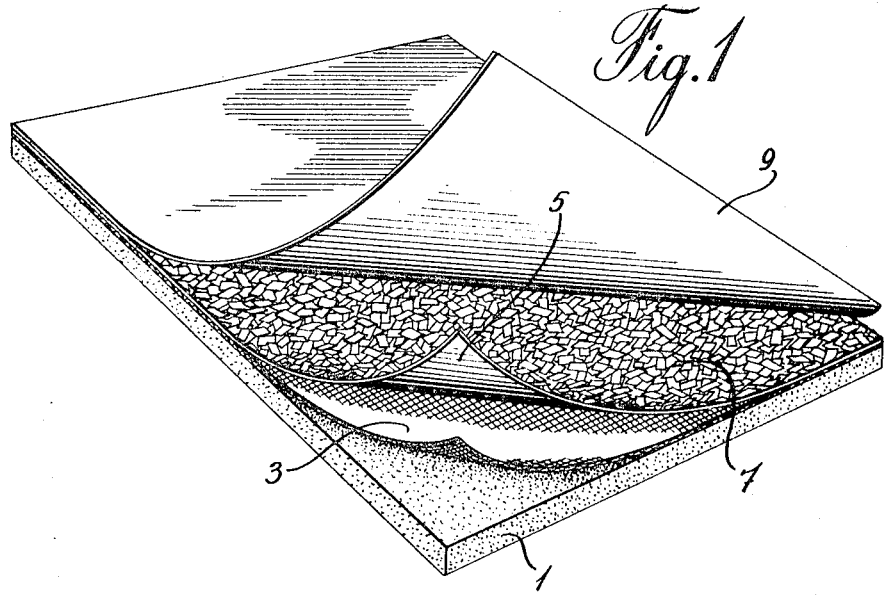
FIG. 1 is a perspective view of the floor covering of my invention with the various component layers separated and lifted at one corner.
Figure 2:
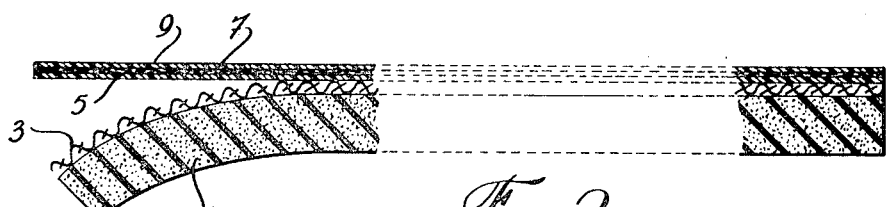
FIG. 2 is a cross-sectional view on an enlarged scale showing the sponge backing layer and fiber glass layer separated from the wear-resistant layers between which is inserted the layer of metal particles which is the improvement of the invention.
Figure 3:
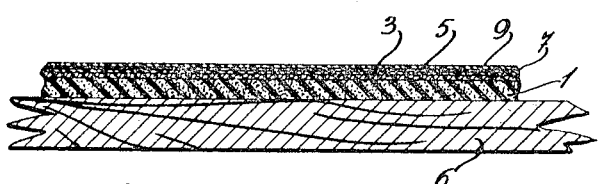
FIG. 3 is a cross-sectional view of the floor covering as mounted over a floor.

The drawing shows a resilient backing layer 1, preferably foam rubber, foam vinyl, or felt paper covered on one face thereof by a fabric 3 of tightly woven glass fibers, followed by a first layer 5 of a wear-resistant resin such as polyvinyl chloride over the free surface of which is laid the layer 7 that constitutes the improvement of the invention and which is formed by a plurality of minute pieces of a heat-absorbing metal and finally the facing layer 9 of a wear-resistant resin, preferably again polyvinyl chloride. The floor covering is for applying over a floor 6, for instance.

All layers are bonded or otherwise held to one another by methods and substances well know in the art.

The minute pieces of metal are sprinkled over the entire surface of layer 5 in such a way that each one touches or contacts an adjacent piece of metal whereby to suitably transmit the heat generated by a cigarette butt, for instance, to the surrounding pieces so that the heat may be absorbed by as much of this layer of metal as possible.

I have found that the pieces of metal should preferably be somewhat diamond-shaped or shaped like stars or have a configuration which is suitable for proper contact between adjacent pieces. The density of the metal pieces should be sufficient to ensure proper distribution of the heat.

As an example, I have found that pieces of metal having overall dimensions of about ¼ of an inch to ¾ of an inch with a thickness varying from 0.001 to 0.005 inch will do very well to provide the necessary heat transmission while retaining the desired flexibility of the material.

The metal pieces could be made of any of the known heat-absorbing metals that could be available at low cost, such as aluminum, zinc, lead, tin or copper with aluminum being the preferred metal.

In the usual manner, the facing layer of polyvinyl chloride can be provided with an inlaid or printed design and its surface may be slightly textured by well-known techniques.

With the improvement of the invention, apart from providing appreciable flexibility, I have found that a cigarette butt which usually emits heat to a temperature of approximately 1200° F. will cause the heat to dissipate to the point where the temperature falls down to approximately 500 to 550° F. Now polyvinyl chloride can withstand a temperature in the area of 400 and 420° F. However, the damage as caused by such a cigarette would be small and generally imperceptible, particularly if trouble is taken to remove the nicotine by appropriate means thereafter.

As mentioned previously, the presence of the minute metal pieces rather than the use of a complete sheet of the same metal has the advantage that the floor covering is more flexible and less brittle as well as providing better bonding qualities between the aluminum and the two layers of polyvinylchloride.

It has also been found that the improvement of the invention may advantageously be incorporated between the two layers of the wear-resistant resin, one of which is bonded directly to the resilient backing layer.

I claim:

1. In a floor covering having a backing layer of resilient material, a layer of fibre glass woven fabric bonded to said backing layer, the improvement in the combination therewith comprising:
   (a) a layer of a wear-resistant resin bonded to said glass fabric;
   (b) a heat-absorbing metallic layer formed by a plurality of minute pieces of a heat-absorbing metal, each metal piece so disposed as to contact at least one adjacent piece in a manner to provide heat dispersion; said last-named layer bonded to and covering the entire surface of said wear-resistant resin, and (c) a further layer of a wear-resistant resin bonded to said layer of metal pieces.

2. A combination as claimed in claim 1, wherein said metal pieces are aluminum.

3. A combination as claimed in claim 1, wherein said wear-resistant resin is polyvinyl chloride.

4. A combination as claimed in claim 3, wherein said metal pieces are generally elongated with overall dimensions ranging from ¼ in. to ⅜ in. and a thickness ranging from 0.001 in. to 0.005 in.

5. A combination as claimed in claim 4, wherein said backing layer is felt paper.

6. A combination as claimed in claim 4, wherein said backing layer is foamed rubber.

References Cited
UNITED STATES PATENTS

| | | | |
|---|---|---|---|
| 3,157,561 | 11/1964 | Miller et al. | 161—413 |
| 3,142,580 | 7/1964 | Holoubek et al. | 161—6 X |
| 3,049,459 | 8/1962 | Smith et al. | 161—3 |
| 3,002,868 | 10/1961 | Boivin | 161—93 X |
| 2,875,087 | 2/1959 | Crandon | 161—3.5 X |
| 2,750,300 | 6/1956 | Kukoff | 161—87 X |

ROBERT F. BURNETT, *Primary Examiner.*

M. A. LITMAN, *Assistant Examiner.*

U.S. Cl. X.R.

52—306; 161—84, 87, 93, 160, 162